United States Patent
Marcus et al.

(10) Patent No.: US 9,205,724 B2
(45) Date of Patent: Dec. 8, 2015

(54) SIDE WINDOW VISOR

(71) Applicant: Marcus Automotive LLC, Holland, MI (US)

(72) Inventors: Jonathan P. Marcus, Holland, MI (US); William J. Fluharty, Holland, MI (US); Kirk William Edwards, Grand Haven, MI (US); Craig William Brekke, Rockford, MI (US)

(73) Assignee: Marcus Automotive, LLC, Holland, MI (US)

( * ) Notice: Subject to any disclaimer, the term of this patent is extended or adjusted under 35 U.S.C. 154(b) by 46 days.

(21) Appl. No.: 13/658,223

(22) Filed: Oct. 23, 2012

(65) Prior Publication Data

US 2013/0313853 A1    Nov. 28, 2013

Related U.S. Application Data

(60) Provisional application No. 61/651,597, filed on May 25, 2012.

(51) Int. Cl.
*B60J 3/02* (2006.01)

(52) U.S. Cl.
CPC *B60J 3/02* (2013.01); *B60J 3/0213* (2013.01); *B60J 3/0273* (2013.01)

(58) Field of Classification Search
CPC ...... B60J 3/0213; B60J 3/0217; B60J 3/0278; B60J 3/02

USPC ................................. 296/97.9, 97.5
See application file for complete search history.

(56) References Cited

U.S. PATENT DOCUMENTS

| | | | | |
|---|---|---|---|---|
| 4,600,234 A | * | 7/1986 | Jonsas | 296/97.1 |
| 4,640,543 A | * | 2/1987 | Bradley | 296/152 |
| 5,390,973 A | * | 2/1995 | Melotti | 296/97.5 |
| 5,611,590 A | * | 3/1997 | Filgueiras | 296/97.5 |
| 2011/0101725 A1 | * | 5/2011 | Mac | 296/97.9 |

* cited by examiner

*Primary Examiner* — Glenn Dayoan
*Assistant Examiner* — Melissa A Black
(74) *Attorney, Agent, or Firm* — Price Heneveld LLP

(57) ABSTRACT

A wire frame visor includes a generally U-shaped wire frame having inwardly extending spaced-apart opposed ends. An envelope of sun-blocking material is fastened over the generally rectangular wire frame. A mounting structure pivotally receives the opposed ends of the wire frame and is adapted to be secured to a location in a vehicle for use of the visor. In a preferred embodiment of the invention, the mounting structure includes at least one adjustable torque clip which receives an inwardly projecting end of the wire frame to control the pivotal motion of the visor. In one embodiment the torque clip includes a loop which surrounds the end of the wire frame and an adjustment screw for tightening the loop around the wire end. Straps can be employed to attach the mounting structure to a side tubular member of a vehicle when so equipped.

9 Claims, 7 Drawing Sheets

US 9,205,724 B2

SIDE WINDOW VISOR

CROSS-REFERENCE TO RELATED APPLICATIONS

This application claims priority under 35 U.S.C. §119(e) and the benefit of U.S. Provisional Application No. 61/651,597 entitled WIRE FRAME FLEXIBLE SIDE WINDOW VISOR, filed on May 25, 2012, by Jonathan P. Marcus, et al., the entire disclosure of which is incorporated herein by reference.

BACKGROUND OF THE INVENTION

The present invention relates to visors for vehicles.

Some specialty vehicles such as the Jeep® Wrangler® pose new challenges for providing sun-blocking protection. This particular vehicle has a removable top and the seating area is surrounded by an upper tubular member which has a padded covering. There is no typical permanent roof structure with a header for the installation of conventional visors. The forward windshield area has a bar which supports an elementary visor, but one which cannot be effectively moved to a side window sun-blocking position. The tubular member above the side windows have grab handles which are attached by straps to the padded tubular member in the area in which side sun-blocking protection is desired. This construction presents a difficult environment for the installation of a sun visor for providing side window protection. Although a flexible fabric over-spring sun visor has been provided in a conventional vehicle, as represented by U.S. Pat. No. 5,067,765; such construction cannot be used with the construction of the Jeep® Wrangler® as the padded tubular member and grab handle interferes with the mounting of such a visor in the needed area.

As a result, a new approach to side window sun-blocking protection is necessary particularly in the environment of convertible vehicles when the top is removed. The visor of the present invention meets this challenge in a cost effective and efficient sun-blocking design which can be factory installed by the manufacturer or sold as an aftermarket user-installed accessory.

SUMMARY OF THE INVENTION

A wire frame visor includes a generally U-shaped wire frame having inwardly extending spaced-apart opposed ends. An envelope of sun-blocking material is fastened over the wire frame. A mounting structure pivotally receives the opposed ends of the wire frame and is adapted to be secured to a location in a vehicle for use of the visor. In a preferred embodiment of the invention, the mounting structure includes at least one adjustable torque clip which receives an inwardly projecting end of the wire frame to control the pivotal motion of the visor. In one embodiment the torque clip includes a loop which surrounds the end of the wire frame and an adjustment screw for selectively tightening the loop around the wire end. Straps with either hook and loop fasteners, such as Velcro®, or straps with buckles can be employed to attach the mounting structure to a tubular member when the vehicle is so equipped.

Such construction is relatively inexpensive and provides a visor which can be installed either by the manufacturer or by the vehicle owner as an aftermarket accessory. These and other features, objects and advantages of this invention can best be understood with reference to the accompanying drawings together with the following description.

DETAILED DESCRIPTION OF THE PREFERRED EMBODIMENT

Figure 1:
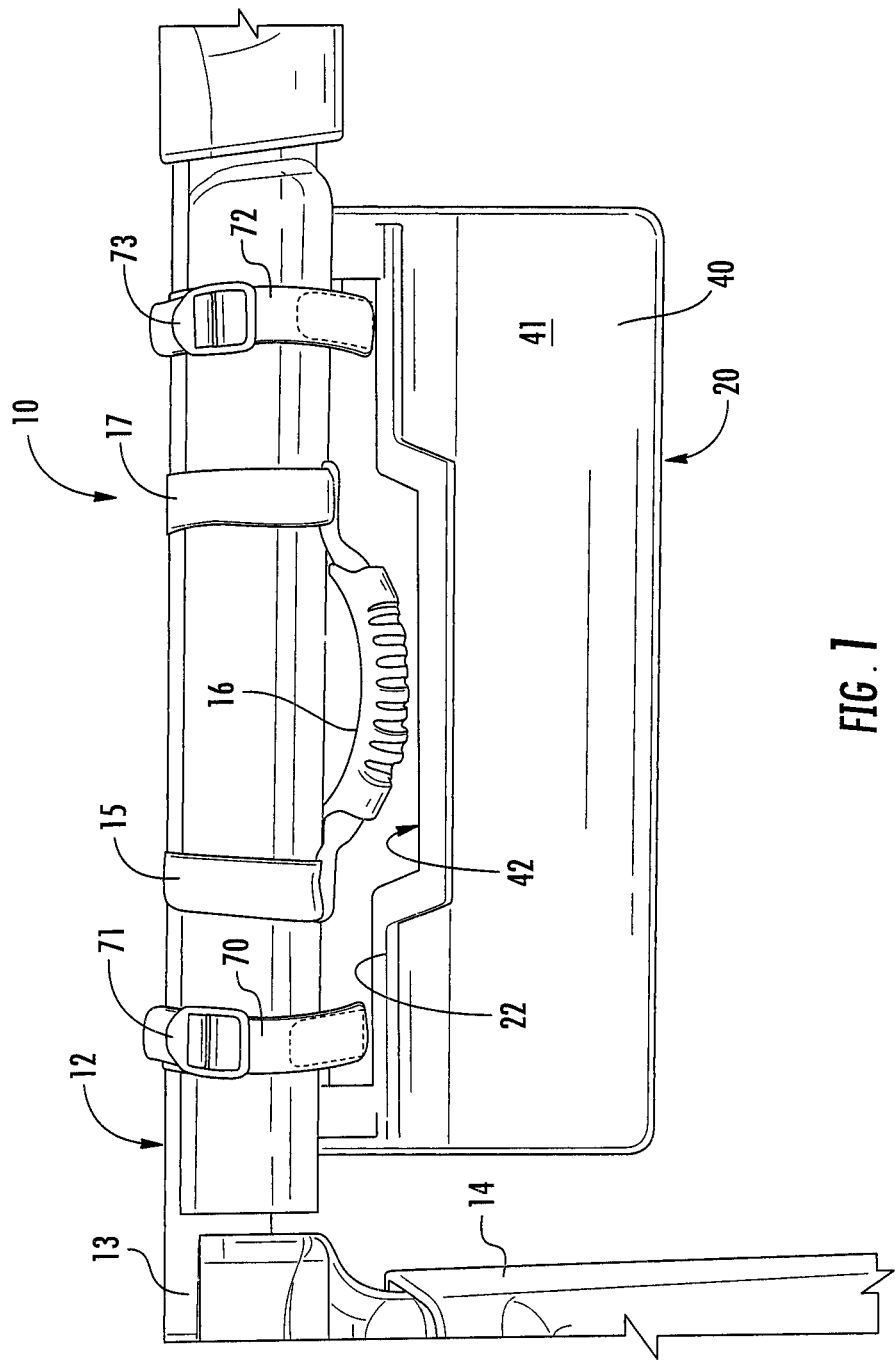
FIG. 1 is a fragmentary front elevational view of a visor embodying the present invention, shown installed in a vehicle and shown in a lowered use position.

Referring initially to FIGS. 1-7, there is shown a vehicle, such as vehicle 10, such as a Jeep® Wrangler®, which has a removable hard top for converting the vehicle to, in essence, a convertible. The vehicle includes a tubular member 12 extending above the side window on each of the sides and vertical posts (A and B pillars) 11, 14 supporting the tubular member 12, which is covered by a cushioning or padding 13. The Jeep® vehicle includes a grab handle 16, which is strapped to the padded tubular member 12 by a pair of straps 15, 17 with hook-and-loop type fasteners at opposite ends. With such construction of the vehicle, a conventional front window visor cannot easily be employed for side window protection partially since the vehicle does not include a conventional headliner and the existence of grab handle 16. In order to provide side window protection, therefore, a unique solution is necessary and, as shown in FIGS. 1-7, a wire frame visor 20 is attached to the padded tubular member 12 for movement between a lowered use position (shown in FIGS. 1, 3, and 5) to a raised stored position (shown in FIGS. 2, 4, and 6).

Figure 6:
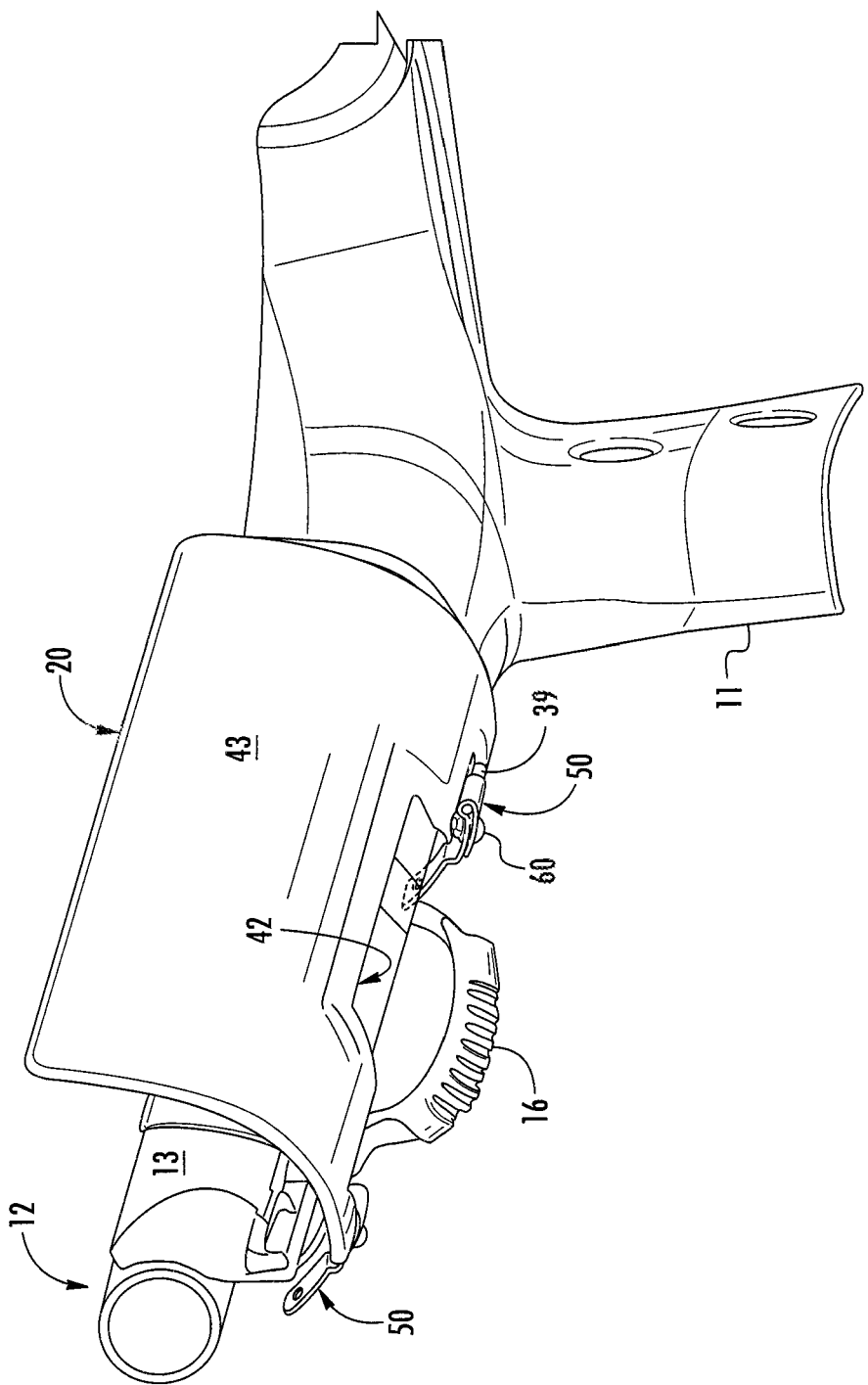
FIG. 6 is a fragmentary perspective view of a visor embodying the present invention, shown positioned for installation in a vehicle and in a raised stored position.
Figure 7:
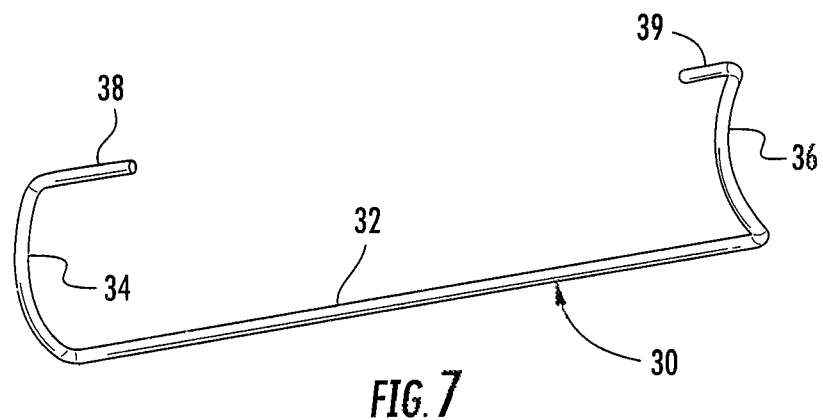
FIG. 7 is a perspective reduced sized view of the wire frame employed with the preferred embodiment of the visor of the present invention.

Visor 20 includes a generally U-shaped wire frame 30 (FIG. 7) including a horizontally extending base leg 32, curved side legs 34 and 36, and inwardly turned, opposed facing ends 38 and 39. The curved sides 34, 36 generally conform to the radius of curvature of tubular member 12, such that, when in a stored position, as best seen in FIG. 6, the visor tends to follow the contour of the tubular member 12. The wire frame 30 is enclosed by an envelope 40 of sun-blocking material, such as a fabric, and preferably a dark fabric, such as black, made of a sun-resistant material, such as Sunbrella®. The envelope 40 is positioned around the frame 30 and stitched around the outer peripheral edges to provide a trim finished appearance to the visor 20 so-formed. The fabric 40 has a front side 41 facing the driver when in the lowered use position, as shown in FIG. 1, and a rear side 43 (FIG. 3), which faces outwardly when the visor is in the lowered use position. Thus, the wire frame 30 is completely covered by the envelope 40 of sun-blocking material to form a generally rectangular visor 20 with a curvilinear profile.

Figure 3:
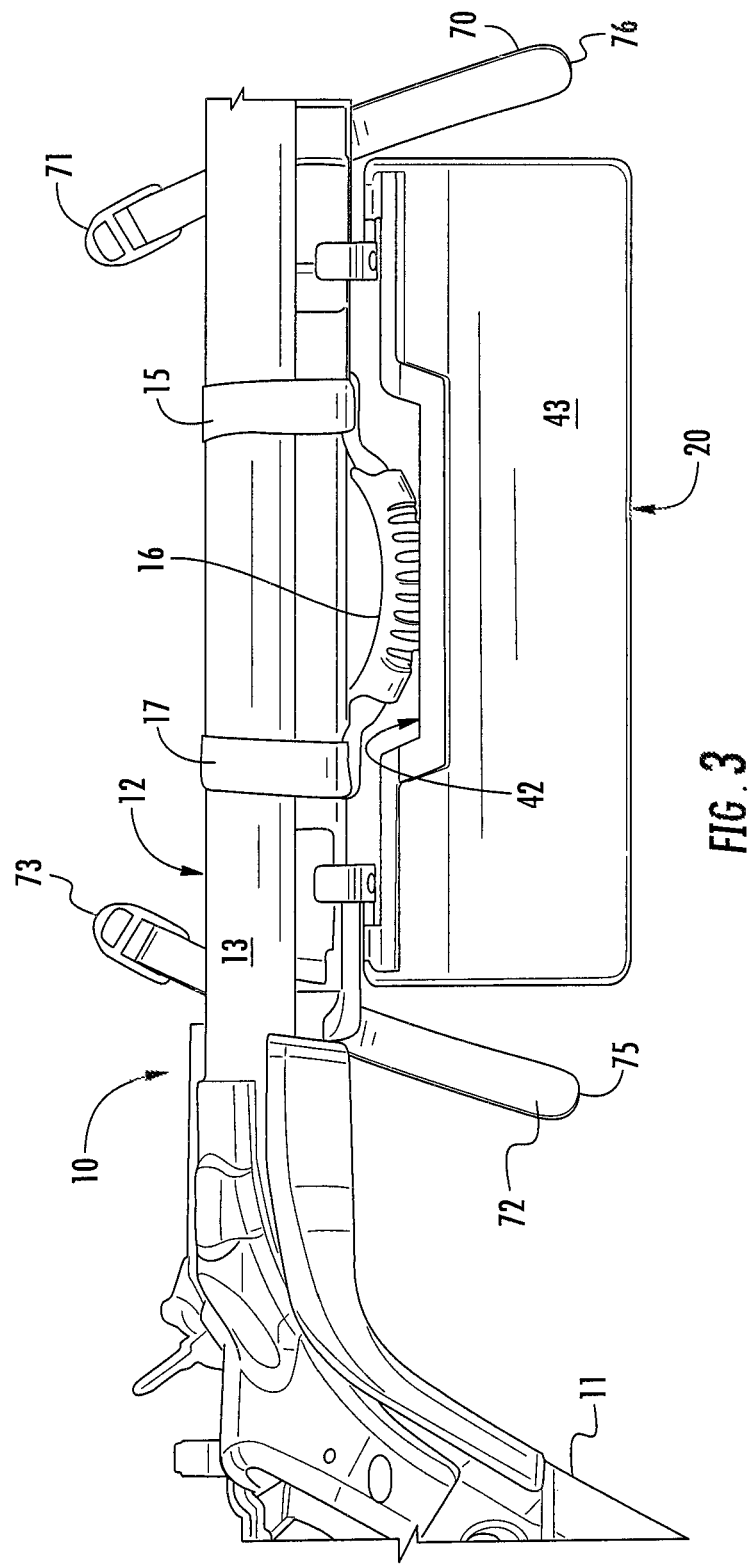
FIG. 3 is a fragmentary rear (from outside of the vehicle) elevational view of a visor embodying the present invention, shown partially installed in a vehicle and shown in a lowered use position.
Figure 4:
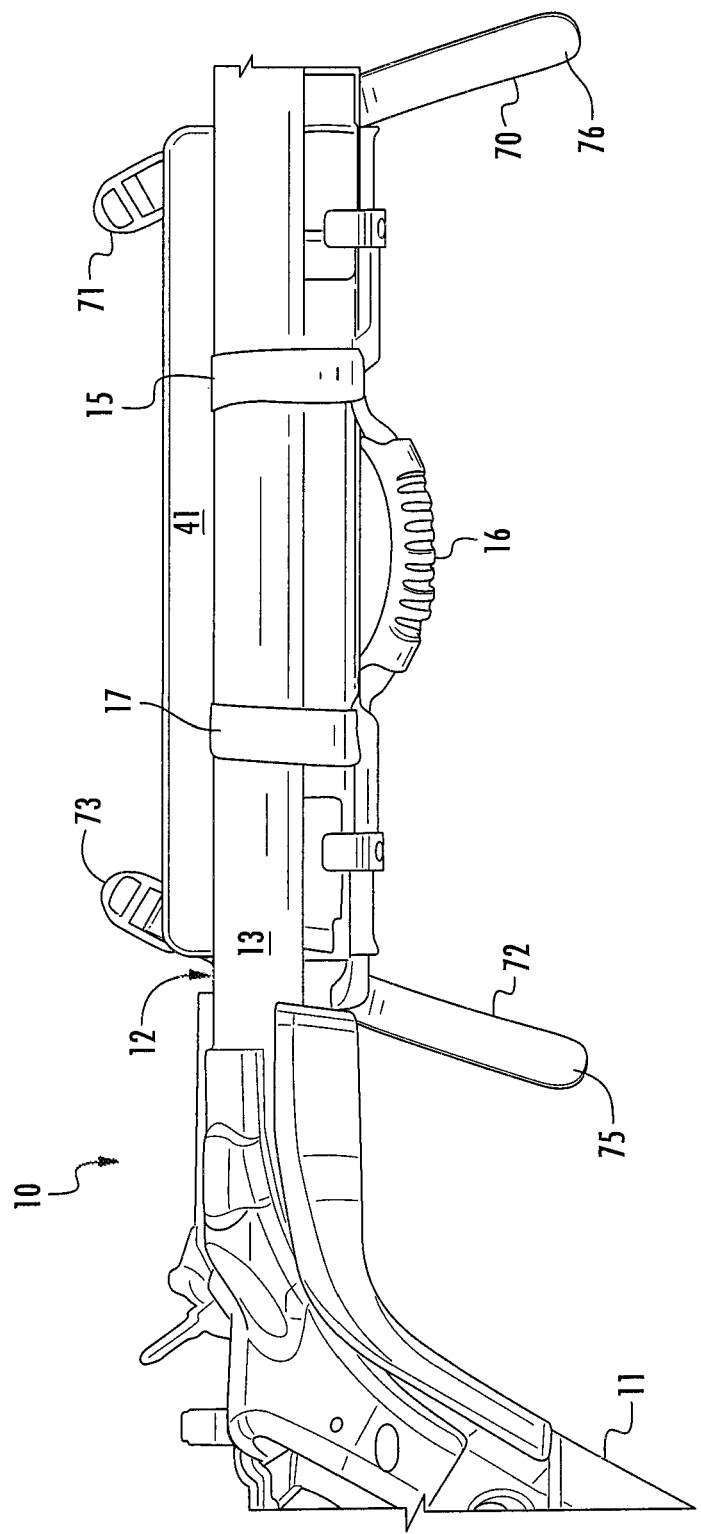
FIG. 4 is a fragmentary rear (from outside of the vehicle) elevational view of a visor embodying the present invention, shown partially installed in a vehicle and shown in a raised stored position.
Figure 5:
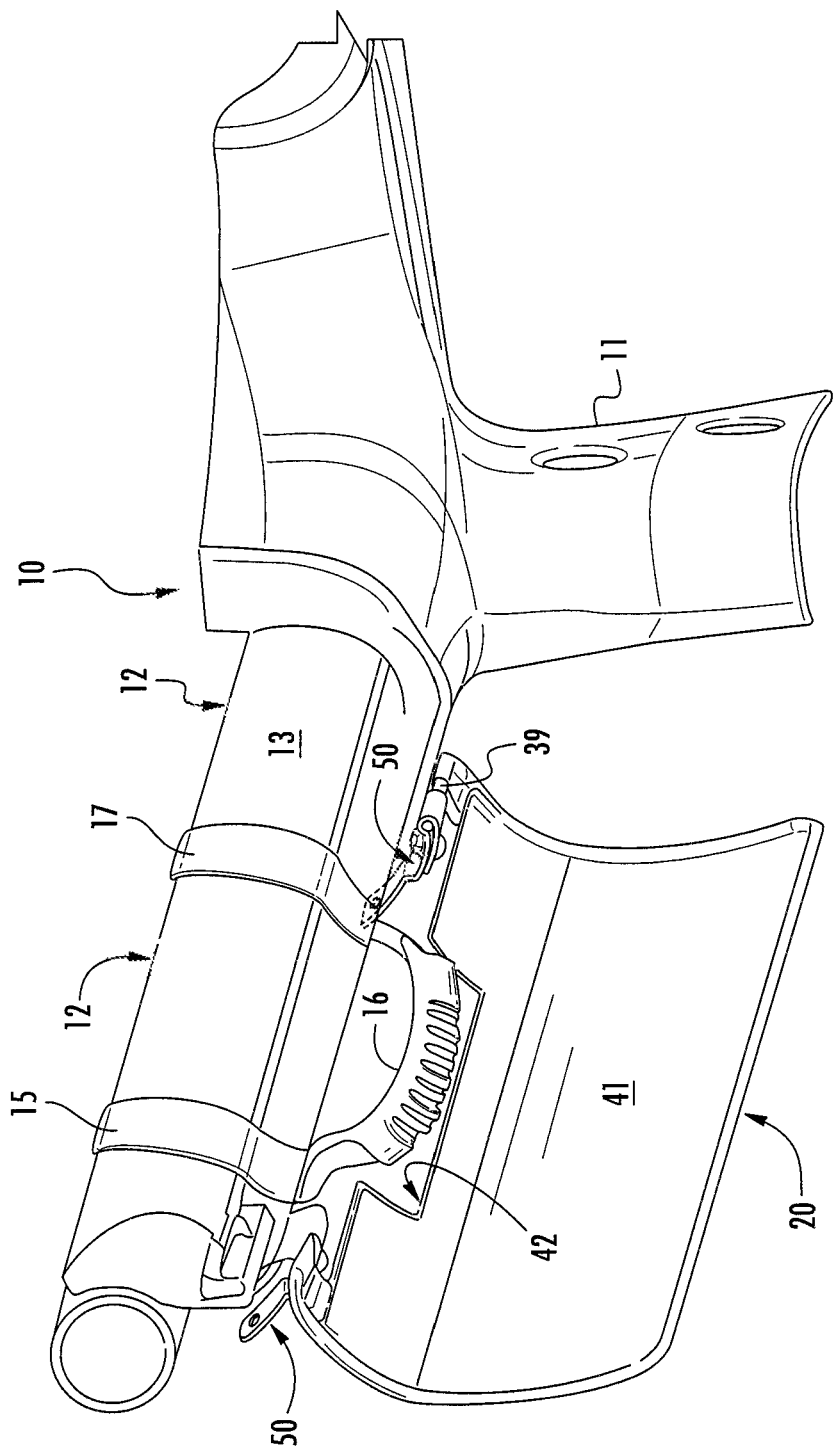
FIG. 5 is a fragmentary perspective view of a visor embodying the present invention, shown positioned for installation in a vehicle and shown in a lowered use position.

The upper edge of visor 20, as seen in FIGS. 1, 3, and 5, includes a notch 42 in the fabric envelope 40 to provide clearance for the grab handle 16 when lowered. The space within the notch 42 is largely filled by handle 16 when in the lowered sun-blocking position, so as to provide effective sun blocking for the visor. In some applications where grab handle 16 is not present, notch 42 would be unnecessary and the upper edge 22 of the visor 20 can be a straight line.

Figure 2:
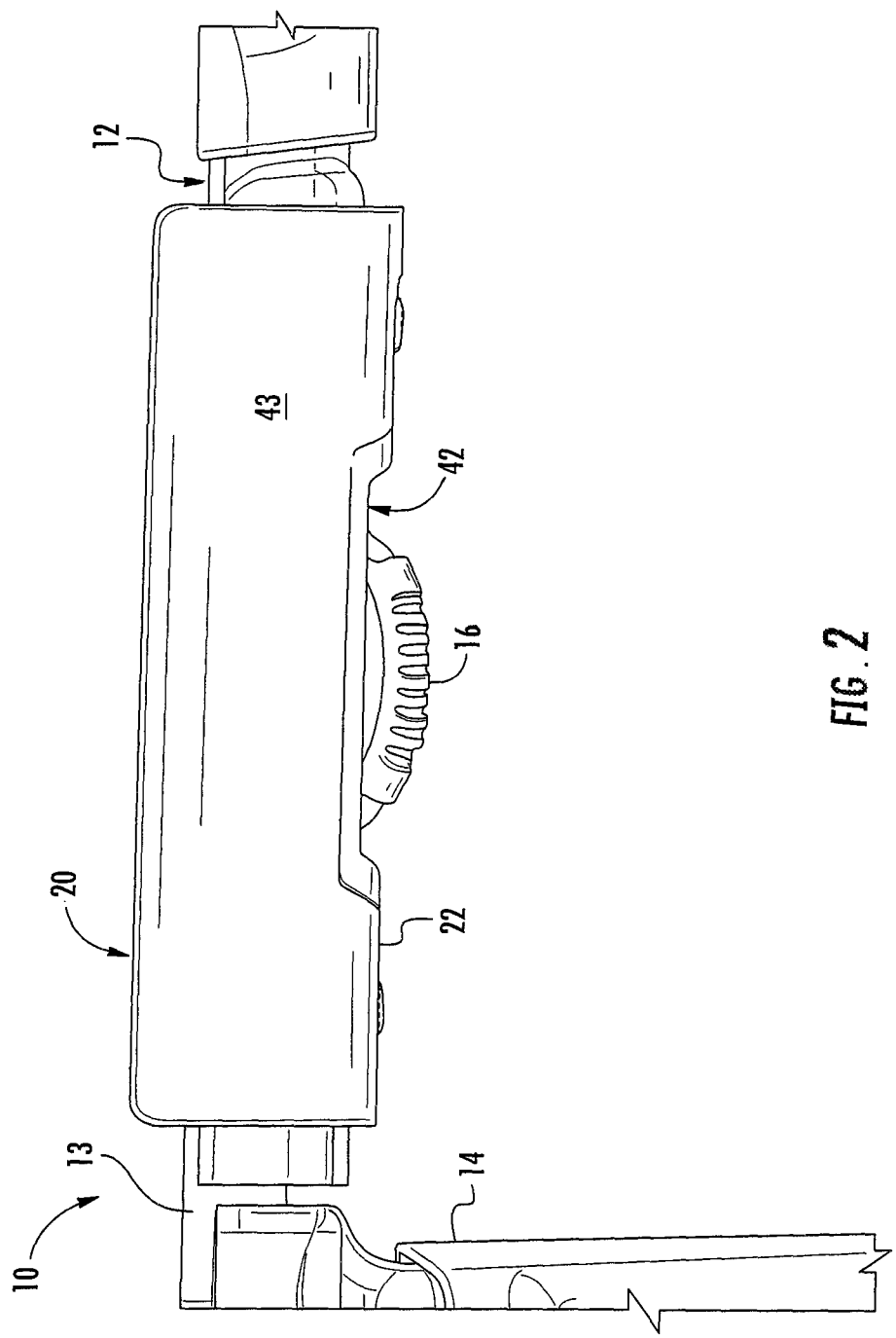
FIG. 2 is a fragmentary front elevational view of a visor embodying the present invention, shown installed in a vehicle and shown in a raised stored position.
Figure 8:
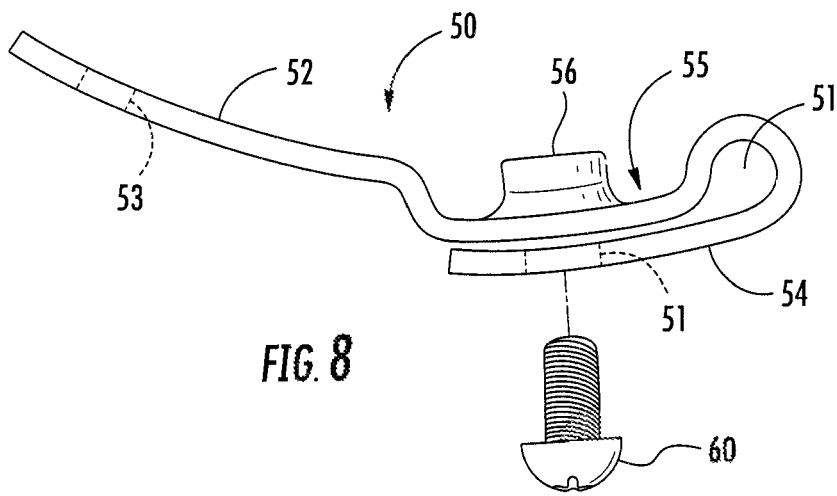
FIG. 8 is a side elevational view of a torque clip employed for mounting the wire frame visor to a vehicle.
Figure 9:
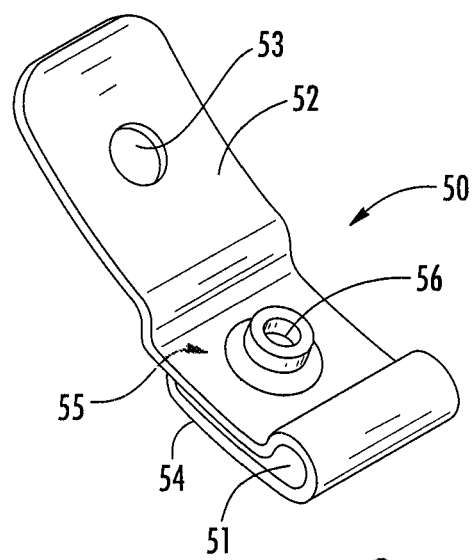
FIG. 9 is a perspective view of the torque clip shown in FIG. 8.

The opposed facing ends 38, 39 of the visor frame 30 are fitted into the open loops 51 of a pair of arcuate torque clips 50, as seen in FIGS. 8 and 9, with the leg 52 of the torque clips also having a radius of curvature approximating that of the padded tubular member 12. The generally arcuate leg 52 has an end leg 54 formed in overlapping relationship with leg 52 and includes an aperture 53 through end leg 54 and a threaded collar 56 in the indetented section 55 of leg 52 for receiving a threaded fastener 60. Threaded fastener 60 can be employed for forcing leg 54 against leg 52. This tightens the grip of aperture 51 of the loop that engages the ends 38, 39 of the wire frame 30 to control torque provided for holding the visor in a raised stored position or a lowered use position and the ease with which the visor can be moved. The fasteners 60 can be adjusted as desired by the user, such that the visor has the desired feel and holding strength for use. The torque fittings 50 and visor 20 are installed on the vehicle by a pair of spaced-apart straps 70 and 72 (best seen in FIGS. 3 and 4 in their unassembled position). Straps 70 and 72 overlie and cover the clips 50 when the visor is positioned in alignment with the padded tubular member 12 and the straps secured, as shown in FIGS. 1 and 2. Straps 70 and 72 may be hook-and-loop type straps employing a Velcro® material or, as illustrated in FIGS. 1, 3, and 5, may have buckles 71 and 73 through which the opposite ends 75 and 76 of the straps extend and are fastened to tightly secure the arcuate torque fittings 50 and attached visor 20 to the outer surface of the padded tubular member 12.

Although the visor is particularly suited for attachment to a Jeep® Wrangler® and the side tubular frame members of such a vehicle, it can be used in other vehicle environments. Clips 50 include mounting apertures 53 in leg 52, such that, if desired, the torque clips can be secured by threaded fasteners to other structural members in different vehicles. In such cases, a cover would enclose the clips 50. In some applications, it may be desirable to provide a stiffener panel within the envelope 40 of the visor 20 so-formed, although to reduce the cost and weight of the visor 20, the wire frame with a two-layer envelope 40 of fabric material having a front surface 41 and a rear surface 43 is preferable. The fabric can be replaced with a tinted film if desired.

Although stitching around the outer periphery of the visor 20 provides a trim appearance, other methods of attaching the envelope to the visor may be employed, such as by use of an adhesive, ultra sonic welding, or other conventional manufacturing techniques. When installed in the vehicle 10 as illustrated in FIGS. 1 and 2, the visor 20 provides an effective sun-blocking visor for the side window area of a specialty vehicle, such as a Jeep® Wrangler® and is relatively inexpensive to manufacture. It can be sold as an aftermarket item, where the vehicle owner can easily install the visor by employing straps provided as part of an installation kit. Thus, with the visor of the present invention, a lightweight, relatively inexpensive and yet effective visor is provided for a vehicle and one which does not interfere with other vehicle components, such as a grab handle above a side window.

It will become apparent to those skilled in the art that various modifications to the preferred embodiment of the invention as described herein can be made without departing from the spirit or scope of the invention as defined by the appended claims.

The invention claimed is:

1. A wire frame visor for extending partially around a cylindrical roll bar of an open-roofed vehicle comprising:
    a generally U-shaped wire frame having inwardly extending spaced-apart opposed ends, said wire frame curved to partially surround the vehicle roll bar when in a stored position;
    a sun-shading fabric envelope positioned over said wire frame; and
    a pair of torque clips pivotally receiving the opposed ends of said wire frame, said torque clips adapted to be secured to the roll bar of the vehicle for use of the visor and control the position of the visor between raised stored positions and lowered use positions.

2. The visor as defined in claim 1 wherein each of said torque dips include a folded-over end defining a loop for receiving an end of said wire frame and an aperture extending through said end for adjusting the diameter of said loop to adjust the rotational torque of said visor.

3. The visor as defined in claim 2 wherein said torque lips and attached visor are secured to a vehicle using straps.

4. The visor as defined claim 3 wherein said straps include hook-and-loop fasteners.

5. The visor as defined in claim 4 wherein said envelope is made of fabric.

6. The visor as defined in claim 5 wherein said fabric is opaque.

7. The visor as defined in claim 6 wherein said fabric is black.

8. A visor for a vehicle with a side bar having a grab handle above a side window area, said visor comprising:
    a visor body having U-shaped wire frame defining an upper edge with a slot for clearing said grab handle, said frame including opposed ends and wherein said wire frame has side legs which are curved;
    fabric envelope made of a sun-shielding material positioned over said frame; and
    mounting structure pivotally coupling said opposed ends of said frame to the vehicle for use of the visor, wherein said wire frame Pre are inwardly extending opposed space-part ends, such that said slot clears said grab handle as said visor is moved between raised and lowered positions, and wherein said mounting structure includes a pair of torque clips for receiving said opposed ends of said wire frame and wherein said torque clips and attached visor are secured to a vehicle using straps which include hook-and-loop fasteners which include folded-over ends defining a loop for receiving ends of said wire frame and an aperture extending through said ends for adjusting the diameter of said loop to adjust the rotational torque of said visor.

9. The visor defined in claim 8 wherein said fabric is opaque.

* * * * *